United States Patent
Han et al.

(10) Patent No.: US 10,248,845 B2
(45) Date of Patent: Apr. 2, 2019

(54) METHOD AND APPARATUS FOR FACIAL RECOGNITION

(71) Applicant: Samsung Electronics Co., Ltd., Suwon-si, Gyeonggi-do (KR)

(72) Inventors: Seungju Han, Seoul (KR); Sungjoo Suh, Seoul (KR); Jungbae Kim, Seoul (KR); Jaejoon Han, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 115 days.

(21) Appl. No.: 14/816,450

(22) Filed: Aug. 3, 2015

(65) Prior Publication Data

US 2016/0110587 A1   Apr. 21, 2016

(30) Foreign Application Priority Data

Oct. 21, 2014 (KR) .................. 10-2014-0142629

(51) Int. Cl.
*G06K 9/00* (2006.01)
*A45D 44/00* (2006.01)
*G06K 9/62* (2006.01)

(52) U.S. Cl.
CPC ....... *G06K 9/00288* (2013.01); *A45D 44/005* (2013.01); *A45D 2044/007* (2013.01); *G06K 2009/6213* (2013.01)

(58) Field of Classification Search
CPC .......... A45D 2044/007; A45D 44/005; G06K 2009/6213; G06K 9/00255; G06K 9/00281; G06K 9/00288; G06K 9/6201
USPC ........................................... 382/118
See application file for complete search history.

(56) References Cited

U.S. PATENT DOCUMENTS

| 2008/0267443 | A1  | 10/2008 | Aarabi |
| 2010/0226531 | A1  | 9/2010  | Goto   |
| 2012/0044335 | A1* | 2/2012  | Goto ................... A45D 44/005 348/77 |
| 2012/0223956 | A1* | 9/2012  | Saito ................... A45D 44/005 345/582 |

FOREIGN PATENT DOCUMENTS

| JP | 2011008397 A | 1/2011 |
| KR | 20020007744 A | 1/2002 |
| KR | 20120009710 A | 2/2012 |

\* cited by examiner

*Primary Examiner* — Manuchehr Rahmjoo
(74) *Attorney, Agent, or Firm* — Harness, Dickey & Pierce, P.L.C.

(57) ABSTRACT

A facial recognition method includes identifying a first makeup pattern in a region of interest (ROI) of a first image, applying one of the first makeup pattern and a candidate makeup pattern to a ROI of a second image corresponding to the ROI of the first image to generate a third image and recognizing a face based on the first image and the third image.

18 Claims, 8 Drawing Sheets

| ROI | Category | Candidate pattern | | | | | | | |
|---|---|---|---|---|---|---|---|---|---|
| Eyebrow | | Basic | Arched | High-arched | Linear | Wavy | Angularly-arched | Angular | Round |
| Eye | Eyeshadow | 1 | 1 2 | 1 2 3 | 1 2 | | | | |
| | Eyeliner | | | | | | | | |
| | Mascara | | | | | | | | |
| Nose | | | | | | | | | |
| Mouth | | Lip colors | Lip gloss | Lip liner | | | | | |

METHOD AND APPARATUS FOR FACIAL RECOGNITION

CROSS-REFERENCE TO RELATED APPLICATION

This application claims the priority benefit of Korean Patent Application No. 10-2014-0142629, filed on Oct. 21, 2014, in the Korean Intellectual Property Office, the entire contents of which are incorporated herein by reference in its entirety.

BACKGROUND

1. Field

At least some example embodiments relate to a method and an apparatus for facial recognition.

2. Description of the Related Art

Facial recognition technology, which belongs to a field of biometrics, may be considered convenient and competitive because the technology applies non-contact verification of a target, dissimilar to other recognition technologies, for example, fingerprint recognition and iris recognition, requiring a user to perform an action or a movement. Recently, due to the convenience and effectiveness, the facial recognition technology has been applied to various application fields, for example, security systems, mobile authentication, and multimedia data search.

However, the facial recognition technology is performed based on an image and thus, the facial recognition technology may be sensitive to a change in a face before and after a makeup and a change in a makeup method, although a face of an identical person is recognized.

SUMMARY

At least some example embodiments relate to a facial recognition method.

In at least some example embodiments, the facial recognition method may include identifying a first makeup pattern in a region of interest (ROI) of a first image, applying one of the first makeup pattern and a candidate makeup pattern to a ROI of a second image corresponding to the ROI of the first image to generate a third image, and recognizing a face based on the first image and the third image.

The identifying may identify the ROI of the first image and identify the first makeup pattern from a plurality of makeup patterns corresponding to the identified ROI.

The identifying may identify the first makeup pattern based on at least one of a color tone, a smoothness, a texture, and a highlight of the ROI of the first image.

The ROI of the first image may correspond to at least one of an eye, a nose, a lip, an eyebrow, hair, a cheek, and a chin of a face included in the first image.

The facial recognition method may further include verifying whether a second makeup pattern is applied to the ROI of the second image. The applying may include, determining whether to generate the third image by applying the first makeup pattern to the ROI of the second image based on the verifying.

The applying may apply the first makeup pattern to the ROI of the second image if the second makeup pattern is not applied to the ROI of the second image.

The applying may apply the first makeup pattern to the ROI of the second image or generate a fourth image by applying the second makeup pattern to the ROI of the first image if the second makeup pattern is applied to the ROI of the second image. The recognizing may recognize the face based on the first image and the third image or the second image and the fourth image.

The recognizing may include, matching a first feature from the ROI of the first image to a second feature from an ROI of the third image.

The candidate pattern may have a similarity to the first makeup pattern and the applying may apply the candidate pattern to the ROI of the second image.

The candidate pattern is classified based on users stored in the database.

The first image may include the ROI to which the first makeup pattern is applied, and the second image may include an ROI to which the first makeup pattern is not applied.

The first image and the second image may be images including ROIs to which different makeup patterns are applied.

At least other example embodiments relate to a facial recognition apparatus.

In at least some example embodiments, the facial recognition apparatus may include a makeup pattern identifier configured to identify a first makeup pattern in a ROI of a first image, a makeup pattern applier configured to generate a third image by applying one of the first makeup pattern and a candidate makeup pattern to an ROI of a second image corresponding to the ROI of the first image, and a face recognizer configured to recognize a face based on the first image and the third image.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Hereinafter, at least some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Figure 1:
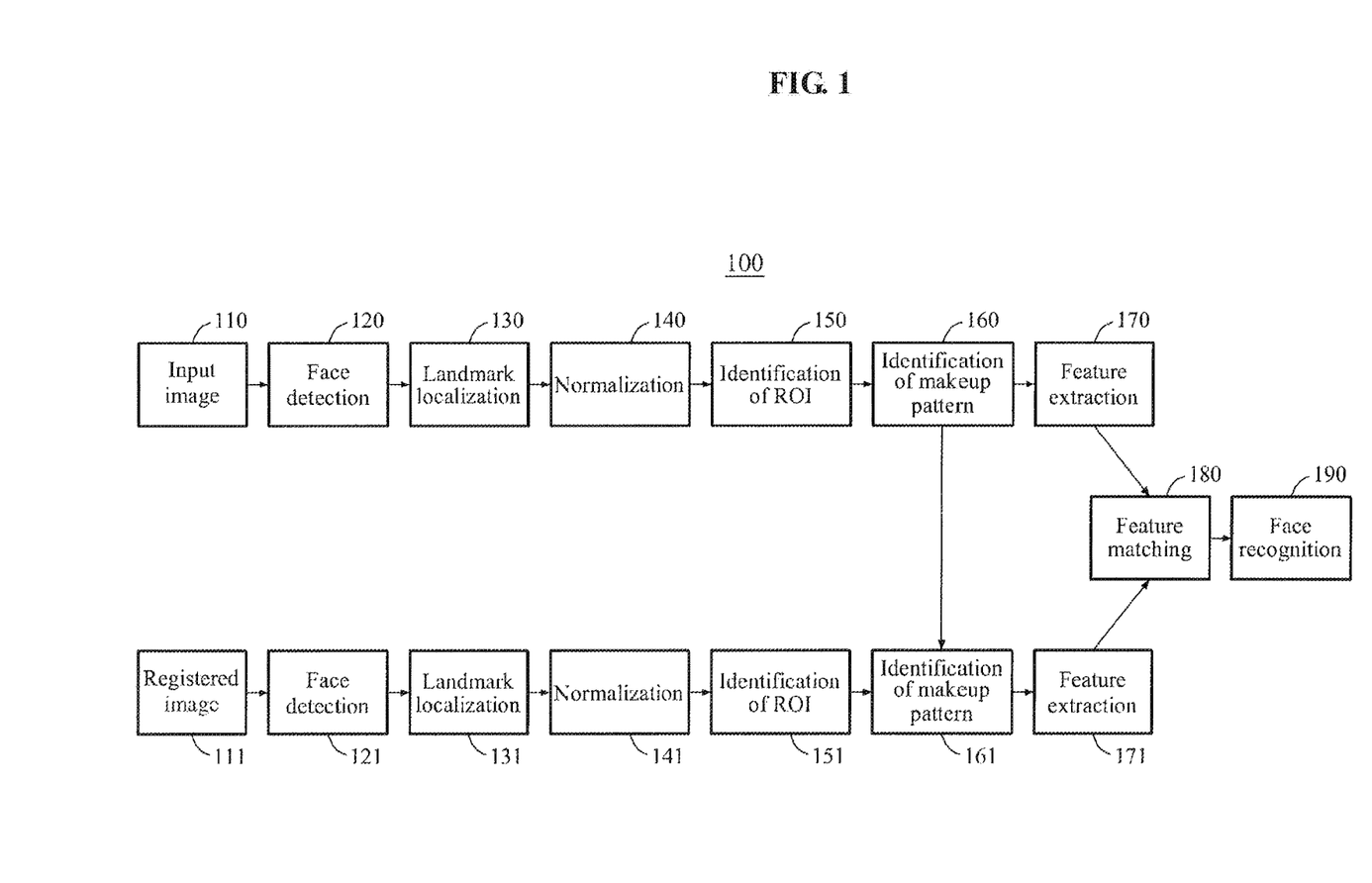
FIG. 1 illustrates an example of an overall operation of a facial recognition apparatus according to at least one example embodiment.

FIG. 1 illustrates an example of an overall operation of a facial recognition apparatus 100 according to at least one example embodiment.

The facial recognition apparatus 100 may be hardware, firmware, hardware executing software or any combination thereof. When at least a portion of the facial recognition apparatus 100 is hardware, such existing hardware may include one or more Central Processing Units (CPUs), digital signal processors (DSPs), application-specific-integrated-circuits (ASICs), field programmable gate arrays (FPGAs) or the like configured as special purpose machines to perform the functions of the facial recognition apparatus 100. CPUs, DSPs, ASICs and FPGAs may generally be referred to as processing devices.

In the event where the facial recognition apparatus 100 is a processor executing software, the processor is configured as a special purpose machine to execute the software, stored in a storage medium, to perform the functions of the facial recognition apparatus 100. In such an embodiment, the processor may include one or more Central Processing Units (CPUs), digital signal processors (DSPs), application-specific-integrated-circuits (ASICs), field programmable gate arrays (FPGAs).

Referring to FIG. 1, the facial recognition apparatus 100 recognizes a face of a user using an input image 110 and a registered image 111. For example, the facial recognition apparatus 100 may be used in various application fields, for example, monitoring and security systems, mobile authentication, and multimedia data searches.

The input image 110 may refer to an image including a face region of the user desired to be recognized and a region of interest (ROI) to which a makeup pattern is applied. The registered image 111 may refer to an image including a face region of a pre-registered user and an ROI to which a makeup pattern is not applied.

In operations 120 and 121, the facial recognition apparatus 100 detects a face region from each of the input image 110 and the registered image 111. For example, the facial recognition apparatus 100 may detect the face region from the input image 110 and the registered image 111 using an Adaboost classifier based on a Haar-like feature which is generally used in related technical fields.

In operations 130 and 131, the facial recognition apparatus 100 localizes a landmark from the detected face region. For example, the landmark may indicate a major point used to identify a feature of the face from the detected face region.

In operations 140 and 141, the facial recognition apparatus 100 normalizes the detected face region using the landmark. For example, when a pose of the face in the detected face region is not directed to a frontward direction but faces other directions, the facial recognition apparatus 100 may normalize the face region to allow the face to face a frontward direction. For another example, when a size of the detected face region is smaller than predetermined and/or selected requirements and thus, the face cannot be recognized, the facial recognition apparatus 100 may normalize the face region to allow the size of the detected face region to be adjusted to the predetermined and/or selected requirements. However, when the predetermined and/or selected requirements for the pose, the size, a pixel, a brightness, and a resolution of the detected face region are satisfied, the facial recognition apparatus 100 may omit the normalizing.

In operations 150 and 151, the facial recognition apparatus 100 identifies an ROI from each of the input image 110 and the registered image 111. The ROI may be a region corresponding to any one of an eye, a nose, a lip, an eyebrow, hair, a cheek, and a chin of the face.

In operation 160, the facial recognition apparatus 100 identifies a makeup pattern applied to an ROI of the input image 110. For example, the facial recognition apparatus 100 may identify the makeup pattern based on at least one of a color tone, a smoothness, a texture, and a highlight of the ROI of the input image 110. The color tone may be an index for which a brightness and a saturation of the ROI are reflected. The smoothness may be an index indicating a degree of a smoothness of a surface of the ROI. The texture may be an index indicating a texture of the ROI. The highlight may be an index indicating a degree of a highlight on the ROI in comparison to adjacent regions.

In operation 161, the facial recognition apparatus 100 applies the makeup pattern applied to the ROI of the input image 110 to an ROI of the registered image 111. The ROI of the registered image 111 to which the makeup pattern is to be applied by the facial recognition apparatus 100 may correspond to the ROI of the input image 110. For example, when the ROI of the input image 110 corresponds to eyes, the ROI of the registered image 111 to which the makeup pattern is to be applied may be a region corresponding to the eyes of a face.

The facial recognition apparatus 100 may not directly apply the makeup pattern from the ROI of the input image 110 to the ROI of the registered image 111, but apply, to the ROI of the registered image 111, a candidate pattern identical or similar to the makeup pattern among a plurality of candidate patterns stored in a database. The facial recognition apparatus 100 may determine a similarity between the makeup pattern and the candidate patterns. For example, when a similarity between the makeup pattern and a candidate pattern is greater than a predetermined and/or selected threshold value, the facial recognition apparatus 100 may apply the candidate pattern to the ROI of the registered image 111. The candidate pattern may be a pattern personalized to a pre-registered user corresponding to the registered image 111.

In operations 170 and 171, the facial recognition apparatus 100 extracts a feature from the ROI of the input image 110 and the ROI of the registered image 111. For example, the facial recognition apparatus 100 may extract a feature from the ROI of the input image 110 and the ROI of the registered image 111 to which the makeup pattern is applied, and also from another ROI of the input image 110 and another ROI of the registered image 111 to which the makeup pattern is not applied. The facial recognition apparatus 100 may extract features from the ROIs of the input image 110 and the registered image 111 using a feature extracting method that is generally used in related technical fields.

In operations 180 and 190, the facial recognition apparatus 100 matches the extracted features, and recognizes the face of the user from the input image 110. For example, the facial recognition apparatus 100 may recognize the face from the input image 110, and authenticate the user as the pre-registered user.

Figure 2:
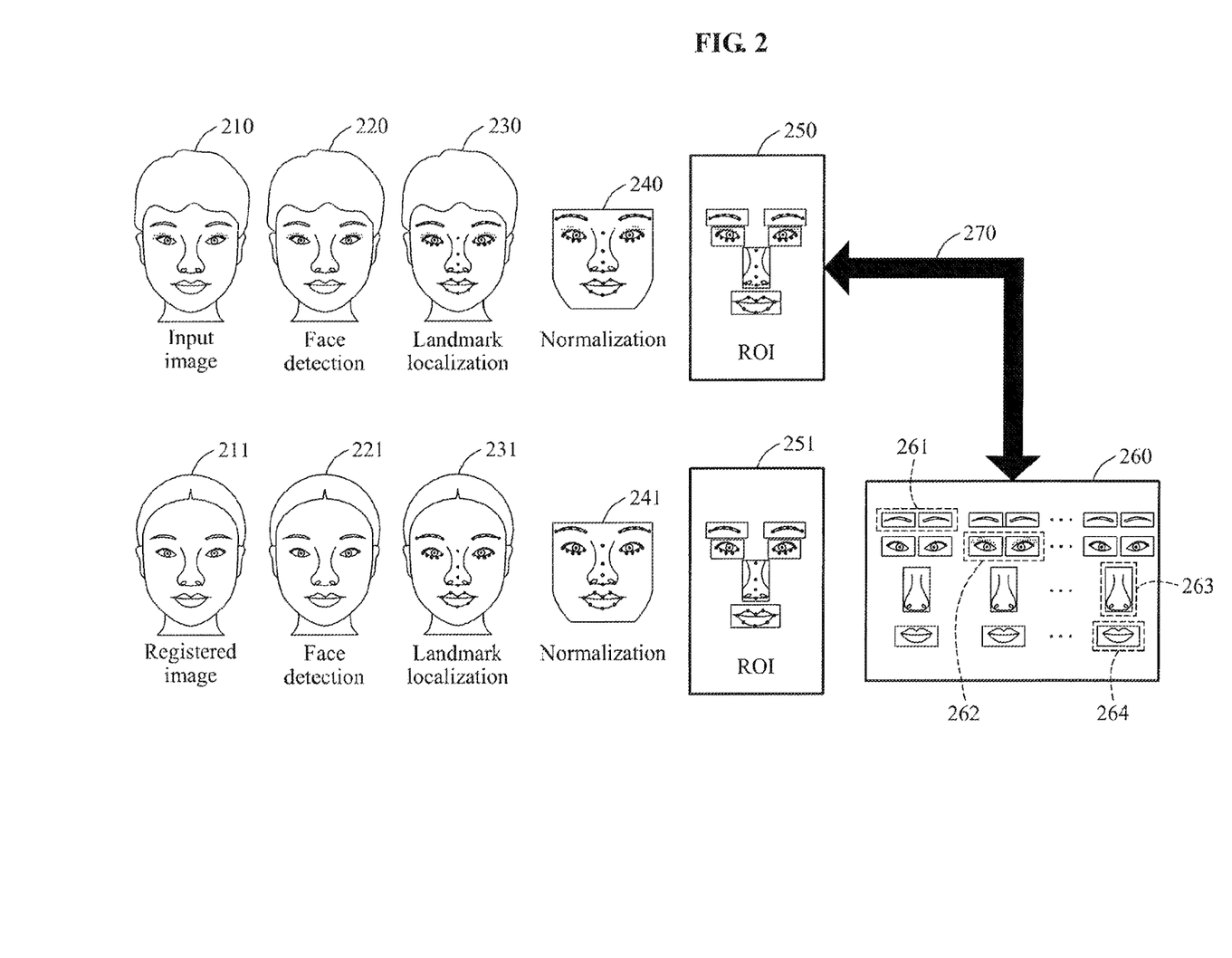
FIG. 2 illustrates an example of recognizing a face by a facial recognition apparatus according to at least one example embodiment.

FIG. 2 illustrates an example of recognizing a face by a facial recognition apparatus according to at least one example embodiment.

In the example of FIG. 2, an input image 210 refers to an image including a face region of a user desired to be recognized, and a makeup pattern is applied to an ROI of the input image 210 corresponding to eyes. A registered image 211 refers to an image including a face region of a pre-registered user, and may include or may not include an ROI to which a makeup pattern is applied.

Referring to FIG. 2, in operations 220 and 221, a facial recognition apparatus detects the face region of each of the input image 210 and the registered image 211. In operations 230 and 231, the facial recognition apparatus localizes a landmark in the detected face region. In operations 240 and 241, the facial recognition apparatus normalizes the detected face region using the landmark.

In operations 250 and 251, the facial recognition apparatus identifies an ROI of each of the input image 210 and the registered image 211. For example, as illustrated in FIG. 2, the identified ROI may be a region corresponding to eyebrows, eyes, a nose, and lips. The facial recognition apparatus may then identify a makeup pattern applied to the ROI.

In operation 260, the facial recognition apparatus applies the makeup pattern identified from the ROI of the input image 210 to the ROI of the registered image 211. For example, the facial recognition apparatus may identify a makeup pattern from an ROI of the input image 210 corresponding to eyebrows, and apply the identified makeup pattern to an ROI of the registered image 211 corresponding to eyebrows in operation 261. Alternatively, the facial recognition apparatus may identify a makeup pattern from an ROI of the input image 210 corresponding to eyes, and apply the identified makeup pattern to an ROI of the registered image 211 corresponding to eyes in operation 262. Alternatively, the facial recognition apparatus may identify makeup patterns from ROIs of the input image 210 corresponding to a nose and lips, and apply the identified makeup patterns to ROIs of the registered image 211 corresponding to nose and lips in operations 263 and 264.

In the example of FIG. 2, as in operation 262, the makeup pattern is applied to the ROI of the input image 210 corresponding to the eyes and thus, the facial recognition apparatus may apply the makeup pattern to the ROI corresponding to the eyes in the registered image 211.

In operation 270, the facial recognition apparatus recognizes a face by comparing the ROI of the input image 210 to the ROI of the registered image 211. In the example of FIG. 2, the facial recognition apparatus may recognize the face by comparing ROIs corresponding to, for example, eyebrows, eyes, a nose, and lips, in the input image 210 and the registered image 211 to which the makeup pattern is not applied, and comparing the respective ROIs corresponding to, for example, the eyes, in the input image 210 and the registered image 211 to which the makeup pattern is applied. The facial recognition apparatus may recognize the face by matching a first feature extracted from the ROI of the input image 210 to a second feature extracted from the ROI of the registered image 211.

Figure 3:
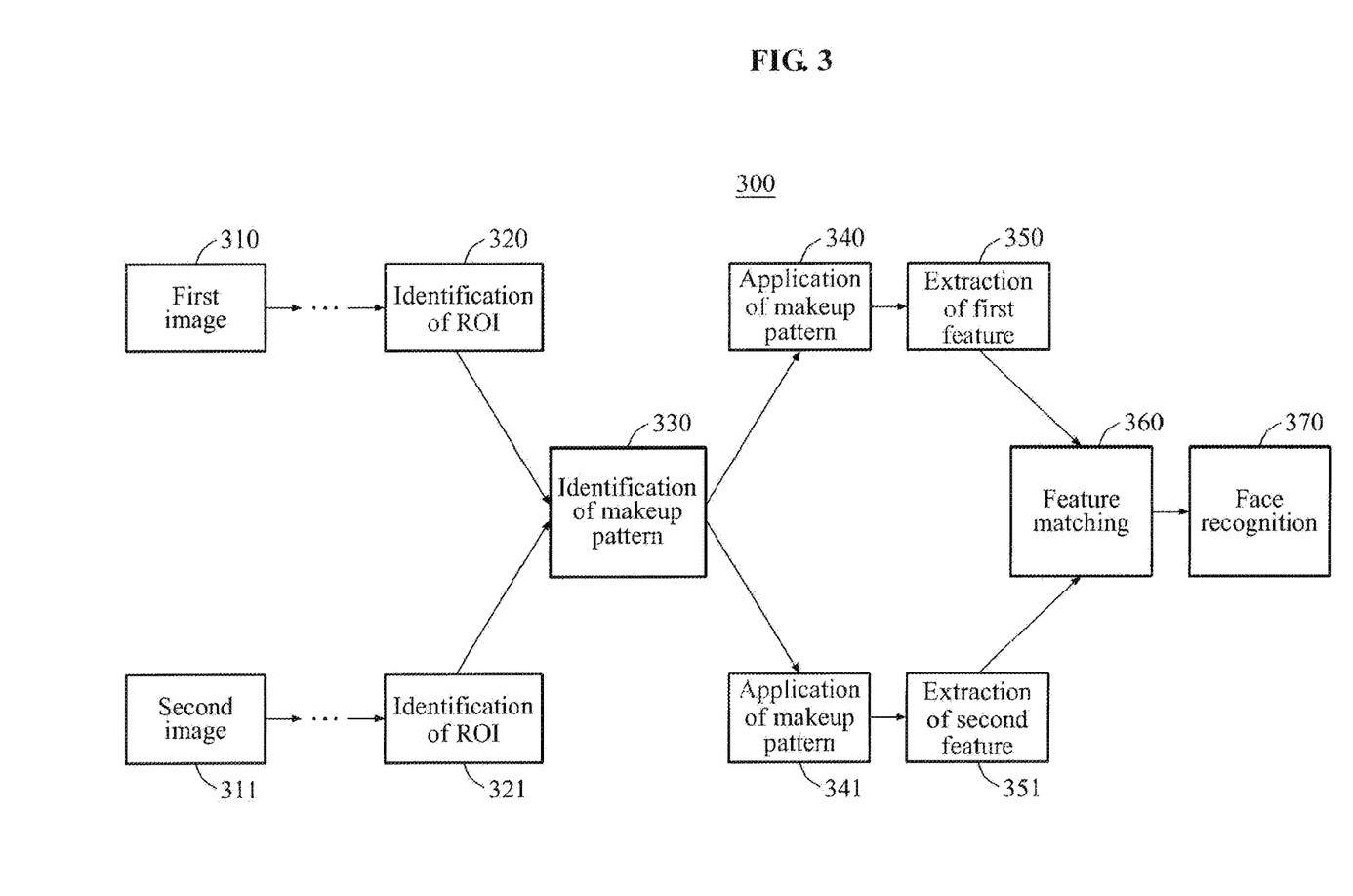
FIG. 3 illustrates another example of an overall operation of a facial recognition apparatus according to at least one example embodiment.

FIG. 3 illustrates another example of an overall operation of a facial recognition apparatus 300 according to at least one example embodiment.

Referring to FIG. 3, the facial recognition apparatus 300 recognizes a face of a user using a first image 310 and a second image 311. For example, the first image 310 refers to an image including a face region of the user desired to be recognized, and the second image 311 refers to an image including a face region of a pre-registered user. In the example of FIG. 3, the first image 310 and the second image 311 includes identical ROIs to which different makeup patterns are applied.

In operations 320 and 321, the facial recognition apparatus 300 identifies an ROI in each of the first image 310 and the second image 311. In operation 330, the facial recognition apparatus 300 identifies makeup patterns applied to the ROIs of the first image 310 and the second image 311. For example, the facial recognition apparatus 300 may identify a first makeup pattern applied to the ROI of the first image 310, and identify a second makeup pattern applied to the ROI of the second image 311. The ROI of the first image 310 to which the first makeup pattern is applied may correspond to the ROI of the second image 311 to which the second makeup pattern is applied.

The facial recognition apparatus 300 selectively applies the first makeup pattern to the ROI of the second image 311 in operation 341. Alternatively, the facial recognition apparatus 300 selectively applies the second makeup pattern to the ROI of the first image 310 in operation 340. For example, the facial recognition apparatus 300 may determine which of the first makeup pattern and the second makeup pattern is to be applied to the ROI of a corresponding image based on a color tone, a smoothness, a texture, and a highlight of the first makeup pattern and the second makeup pattern. The facial recognition apparatus 300 may apply, to the ROI of the corresponding image, a pattern having a higher degree of the highlight between the first makeup pattern and the second makeup pattern.

In operations 350 and 351, the facial recognition apparatus 300 extracts a first feature from the ROI of the first image 310 and a second feature from the ROI of the second image 311. In operations 360 and 370, the facial recognition apparatus 300 recognizes the face of the user by matching the extracted first feature to the extracted second feature.

Figure 4:
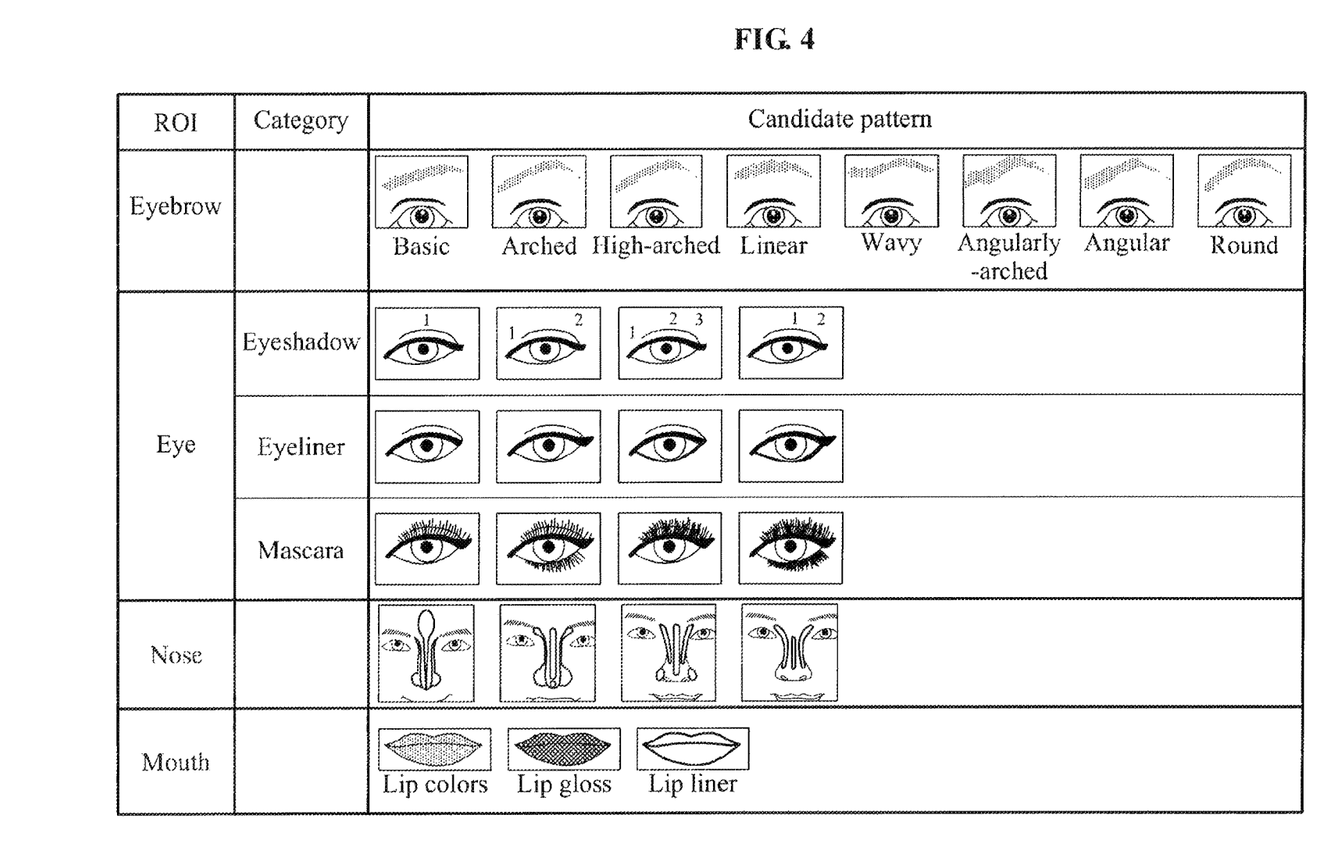
FIG. 4 illustrates an example of candidate patterns stored in a database according to at least one example embodiment.

FIG. 4 illustrates an example of candidate patterns stored in a database according to at least one example embodiment.

Referring to FIG. 4, the candidate patterns are stored in the database. The candidate patterns may be classified based on ROIs, and differently classified based on categories for identical ROIs.

For example, an ROI corresponding to an eyebrow may include candidate patterns, for example, a basic pattern, an arched pattern, a high-arched pattern, a linear pattern, a wavy pattern, an angularly-arched pattern, an angular pattern, and a round pattern. An ROI corresponding to an eye may include categories, for example, an eyeshadow category, an eyeliner category, and a mascara category. Thus, the ROI corresponding to the eye may include different candidate patterns in each category, for example, the eyeshadow category, the eyeliner category, and the mascara category.

In an example, the candidate patterns may be classified based on pre-registered users and the classified candidate patterns for each user may be stored in the database. The ROIs and the categories used to classify the candidate patterns may have different standards depending on the pre-registered users.

In another example, the candidate patterns may be classified based on ROIs and categories illustrated in Table 1 and stored in the database.

TABLE 1

| ROI | Category |
| --- | --- |
| Face | Foundation, concealer, blush, contour, highlight |
| Eyes | Eyeshadow, eyeliner, mascara, brows |
| Lips | Lip colors, lip gloss, lip liner |
| Skincare | Tanning, rosacea, acne, brightening, discoloration |
| Anti-aging | Forehead, rhinoplasty, eyebrows, crow's feet, cheeks, frown lines, under eyes, nasolabial folds, lip augmentation, under lips, smile correction, jaw contouring, facelift |
| Hair | Hairstyle, fair color |

FIG. 4 and Table 1 are provided only as illustrative examples and thus, the candidate patterns stored in the database are not limited to such examples.

Figure 5:
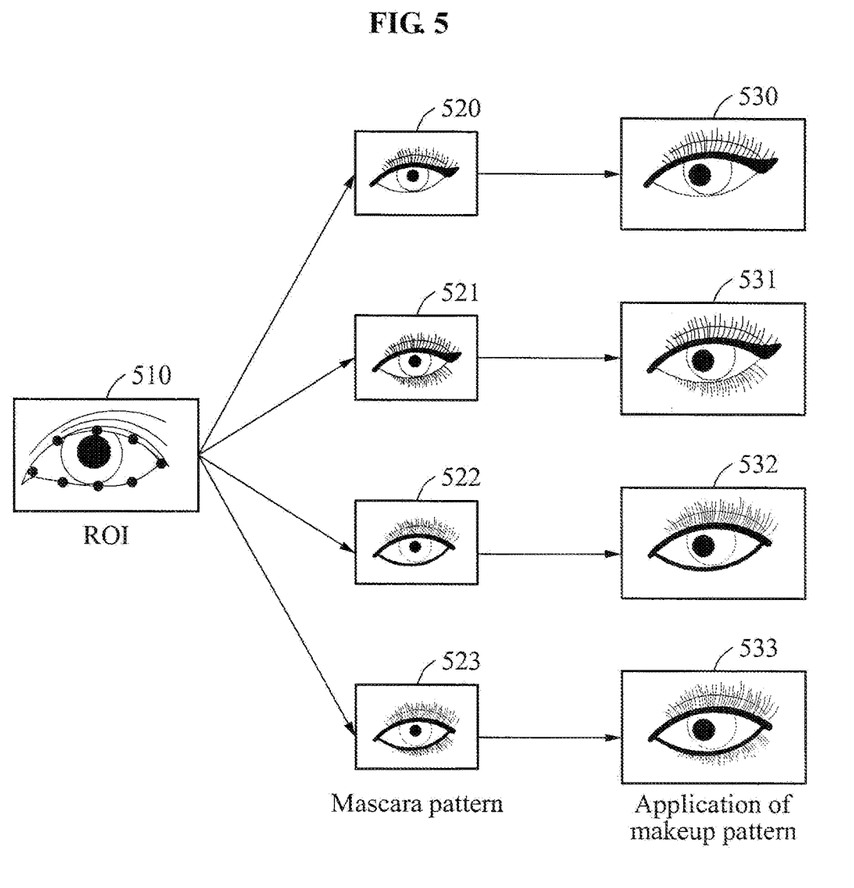
FIG. 5 illustrates an example of applying a makeup pattern to a region of interest (ROI) according to at least one example embodiment.

FIG. 5 illustrates an example of applying a makeup pattern to an ROI according to at least one example embodiment.

Referring to FIG. 5, an ROI 510 corresponding to an eye is extracted. Here, a consideration may be given to a plurality of candidate patterns, for example, 520 through 523, classified based on a mascara category and an eyeliner category corresponding to the ROI 510. For example, a candidate pattern 520 may indicate a makeup pattern to which a first mascara pattern and a first eyeliner pattern are applied. A candidate pattern 521 may indicate a makeup pattern to which a second mascara pattern and the first eyeliner pattern are applied. A candidate pattern 522 may indicate a makeup pattern to which the first mascara pattern and a second eyeliner pattern are applied. A candidate pattern 523 may indicate a makeup pattern to which the second mascara pattern and the second eyeliner pattern are applied.

A facial recognition apparatus may select, from among the candidate patterns 520 through 523, a candidate pattern having a highest similarity to an identified makeup pattern, and apply the selected candidate pattern to the ROI 510. Here, results, for example, 530 through 533, may be obtained by applying the corresponding candidate patterns 520 through 523 to the ROI 510.

Figure 6:
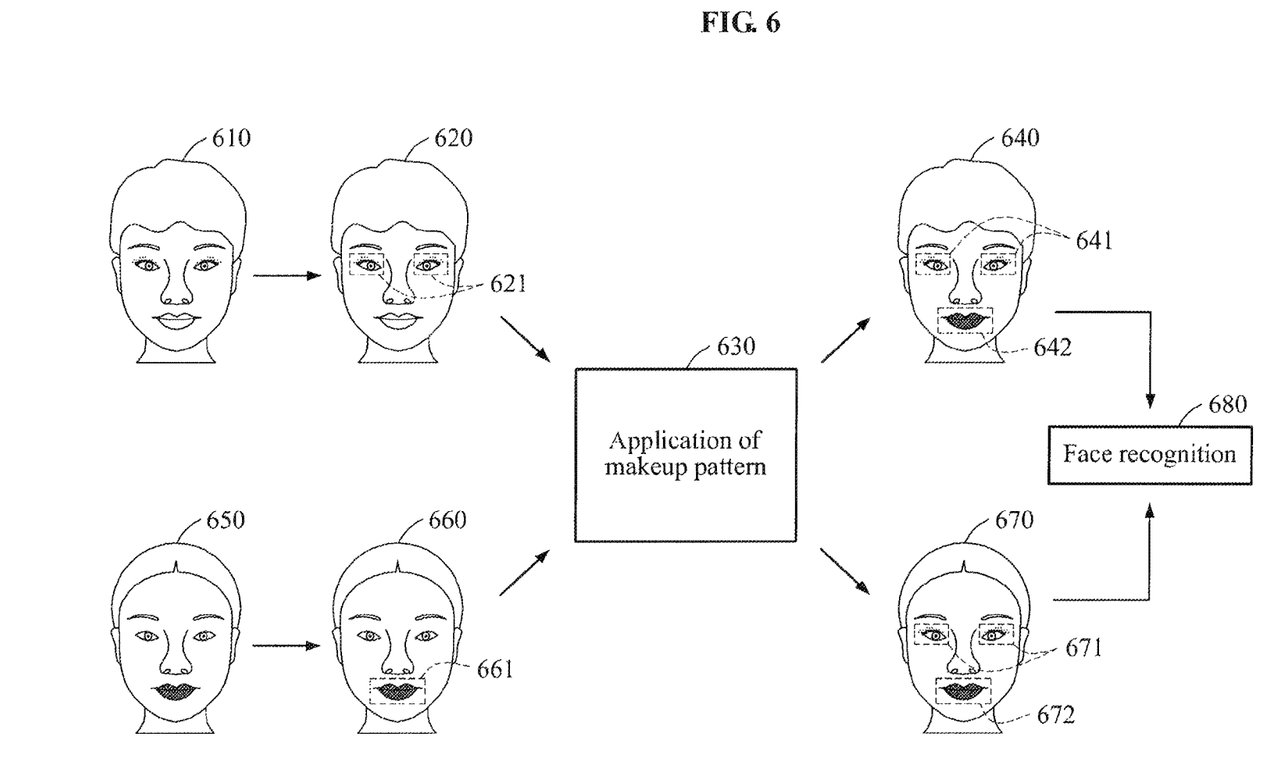
FIG. 6 illustrates an example of recognizing a face when a makeup pattern is applied to each of different ROIs of a first image and a second image according to at least one example embodiment.

FIG. 6 illustrates an example of recognizing a face when a makeup pattern is applied to each of different ROIs of a first image 610 and a second image 650 according to at least one example embodiment.

In the example of FIG. 6, the first image 610 includes an ROI 621 corresponding to eyes and to which a first makeup pattern is applied. The second image 650 includes an ROI 661 corresponding to lips and to which a second makeup pattern is applied. The first image 610 may indicate an image including a face region of a user desired to be recognized. The second image 650 may indicate an image including a face region of a pre-registered user.

Referring to FIG. 6, in operations 620 and 660, a facial recognition apparatus identifies the first makeup pattern from the ROI 621 corresponding to the eyes in the first image 610, and identifies the second makeup pattern from the ROI 661 corresponding to the lips in the second image 650. The facial recognition apparatus may verify that no makeup patterns are applied to an ROI corresponding to lips in the first image 610 and an ROI corresponding to eyes in the second image 650.

In operation 630, the facial recognition apparatus applies the first makeup pattern to the ROI corresponding to the eyes in the second image 650 to generate a third image 670. Also, in operation 630, the facial recognition apparatus applies the second makeup pattern to the ROI corresponding to the lips in the first image 610 to generate a fourth image 640.

The facial recognition apparatus compares an ROI 641 to an ROI 671 corresponding to the eyes in the fourth image 640 and the third image 670, and compares an ROI 642 to an ROI 672 corresponding to the lips in the fourth image 640 and the third image 670. For example, the facial recognition apparatus may extract features from the ROIs 641 and 671 corresponding to the eyes to match the features to one another, and extract features from the ROIs 642 and 672 corresponding to the lips to match the features to one another.

In operation 680, the facial recognition apparatus recognizes the face of the user based on a result of the comparing or a result of the matching.

Figure 7:
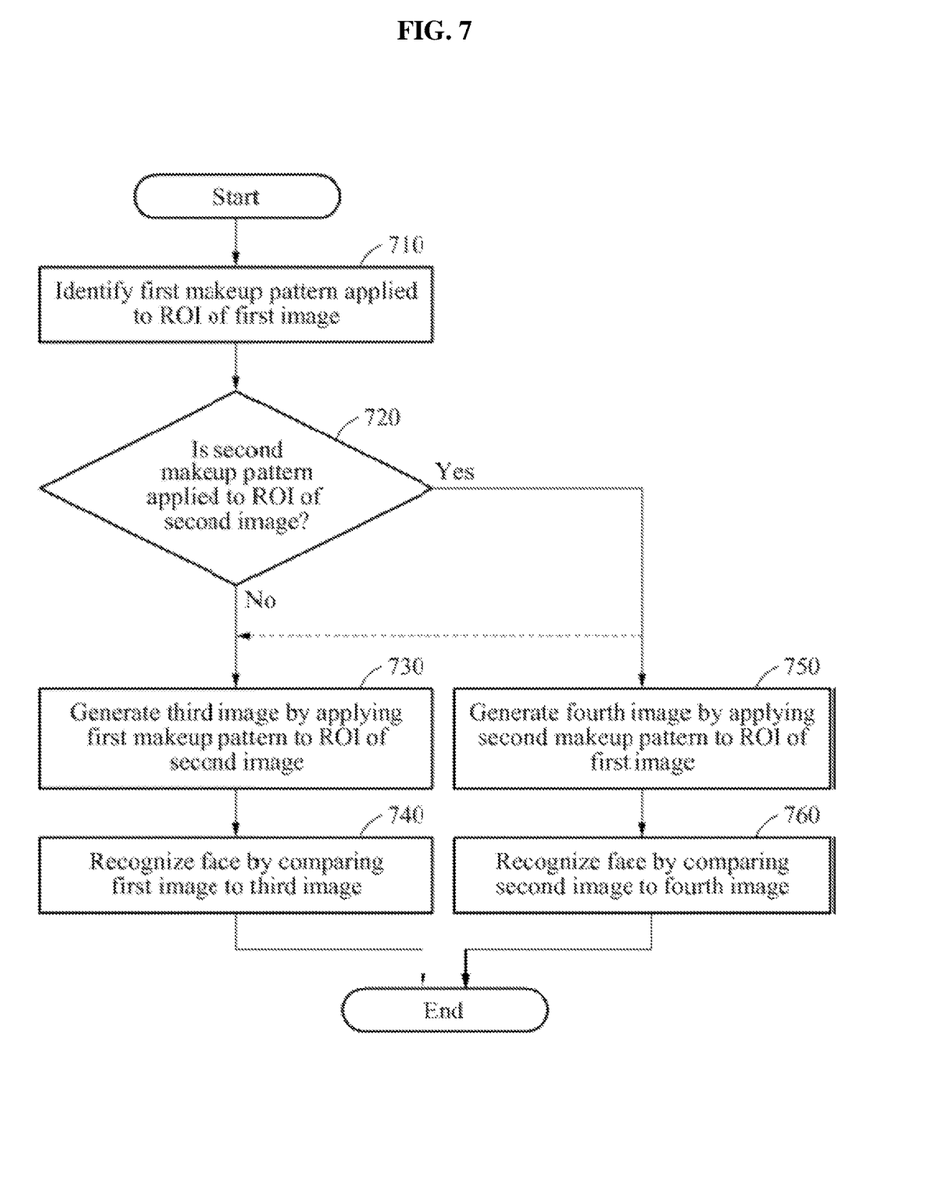
FIG. 7 illustrates an example of a flowchart of a facial recognition method according to at least one example embodiment.

FIG. 7 illustrates an example of a flowchart of a facial recognition method according to at least one example embodiment. The facial recognition method may be performed by a facial recognition apparatus.

Referring to FIG. 7, in operation 710, the facial recognition apparatus identifies a first makeup pattern applied to an ROI of a first image. The facial recognition apparatus may identify the ROI of the first image and then identify the first makeup pattern from a plurality makeup patterns corresponding to the identified ROI. For example, the facial recognition apparatus may identify, as an ROI corresponding to lips, the ROI of the first image to which the first makeup pattern is applied, and identify the first makeup pattern from the plurality of the makeup patterns that may be applicable to the lips. Further, the facial recognition apparatus may identify the first makeup pattern based on at least one of a color tone, a smoothness, a texture, and a highlight of the ROI of the first image.

The ROI may correspond to any one of an eye, a nose, a lip, an eyebrow, hair, a cheek, and a chin of a face included in the first image. The first image may be an image including a face region of a user desired to be recognized and include the first makeup pattern.

In operation 720, the facial recognition apparatus verifies whether a second makeup pattern is applied to an ROI of a second image. The second image may be an image including a face region of a pre-registered user.

In operation 730, when the second makeup pattern is not applied to the ROI of the second image, the facial recognition apparatus generates a third image by applying the first makeup pattern to the ROI of the second image. For example, when a candidate pattern identical or similar to the first makeup pattern is present in a database in which a plurality of candidate patterns are stored, the facial recognition apparatus may generate the third image by applying the candidate pattern identical or similar to the first makeup pattern to the ROI of the second image.

In operation 740, the facial recognition apparatus recognizes the face from the first image by comparing the first image to the third image. For example, the facial recognition apparatus may recognize the face by matching a first feature extracted from the ROI of the first image to a second feature extracted from an ROI of the third image.

In operation 750, when the second makeup pattern is applied to the ROI of the second image, the facial recognition apparatus generates a fourth image by applying the second makeup pattern to the ROI of the first image. For example, when a candidate pattern identical or similar to the second makeup pattern is present in the database in which the makeup patterns are stored, the facial recognition apparatus may generate the fourth image by applying the candidate pattern identical or similar to the second makeup pattern to the ROI of the first image.

In operation 760, the facial recognition apparatus recognizes the face included in the first image by comparing the second image to the fourth image. For example, the facial recognition apparatus may recognize the face by matching features extracted from ROIs of the second image and the fourth image.

However, when the second makeup pattern is applied to the ROI of the second image, the facial recognition apparatus may generate the third image by applying the first makeup pattern to the ROI of the second image in operation 730. In such a case, the facial recognition apparatus may recognize the face from the first image by comparing the first image to the third image in operation 740.

As described in the foregoing, when the second makeup pattern is applied to the ROI of the second image, the facial recognition apparatus may determine a detailed method of recognizing the face. For example, the facial recognition apparatus may determine which of operation 730 and operation 750 is to be applied in order to perform facial recognition based on at least one of a color tone, a smoothness, a texture, and a highlight of the first makeup pattern and the second makeup pattern.

Figure 8:
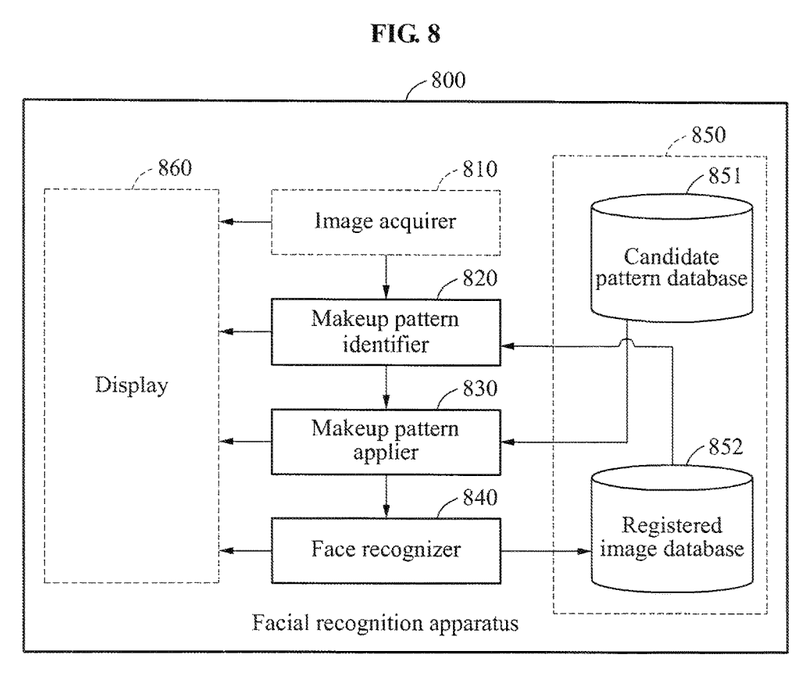
FIG. 8 illustrates an example of a configuration of a facial recognition apparatus according to at least one example embodiment.

FIG. 8 illustrates an example of a configuration of a facial recognition apparatus 800 according to at least one example embodiment.

Referring to FIG. 8, the facial recognition apparatus 800 includes a makeup pattern identifier 820, a makeup pattern applier 830, a face recognizer 840, and a database 850. The facial recognition apparatus 800 may correspond to a facial recognition apparatus described with reference to FIGS. 1-7.

The facial recognition apparatus 800 further includes an image acquirer 810 and a display 860. The database 850 includes a candidate pattern database 851 and a registered image database 852.

The image acquirer 810 may obtain a first image including a face region of a user desired to be recognized. For example, the image acquirer 810 may obtain the first image to recognize or authenticate the user through a camera or an image sensor. For example, the image acquirer 810 may be included in the facial recognition apparatus 800, or be an independent device externally located from the facial recognition apparatus 800, but is not limited to such examples.

The makeup pattern identifier 820 may identify a first makeup pattern applied to an ROI of the first image received from the image acquirer 810. For example, the makeup pattern identifier 820 may identify any one of an eye, a nose, a lip, an eyebrow, hair, a cheek, and a chin corresponding to the ROI of the first image, and identify the first makeup pattern from a plurality of makeup patterns corresponding to the identified ROI. The makeup pattern identifier 820 may identify the first makeup pattern based on at least one of a color tone, a smoothness, a texture, and a highlight of the ROI of the first image.

The makeup pattern identifier 820 may receive a second image including a face region of a pre-registered user from the registered image database 852, and verify whether a second makeup pattern is applied to an ROI of the second image. The ROI of the second image may correspond to the ROI of the first image. For example, when the ROI of the first image corresponds to a nose, the makeup pattern identifier 820 may verify whether the second makeup pattern is applied to an ROI corresponding to the nose in the second image.

However, when the second makeup pattern is not applied to the ROI of the second image, the makeup pattern applier 830 may generate a third image by applying the first makeup pattern to the ROI of the second image. For example, the makeup pattern applier 830 may receive, from the candidate pattern database 851, a candidate pattern identical or similar to the first makeup pattern among the candidate patterns stored in the candidate pattern database 851, and apply the received candidate pattern to the ROI of the second image.

When the second makeup pattern is applied to the ROI of the second image, the makeup pattern applier 830 may generate the third image by applying the first makeup pattern to the ROI of the second image, or generate a fourth image by applying the second makeup pattern to the ROI of the first image. For example, the makeup pattern applier 830 may determine which of the third image and the fourth image is to be generated based on at least one of a color tone, a smoothness, a texture, and a highlight of the first makeup pattern and the second makeup pattern.

The face recognizer 840 may recognize the face by comparing the first image to the third image, or comparing the second image to the fourth image. For example, when the third image is generated by the makeup pattern applier 830, the face recognizer 840 may recognize the face by comparing the first image to the third image. However, when the fourth image is generated by the makeup pattern applier 830, the face recognizer 840 may recognize the face by comparing the second image to the fourth image.

The face recognizer 840 may recognize the face by matching features extracted from the first image and the third image. Alternatively, the face recognizer 840 may recognize the face by matching features extracted from the second image and the fourth image. For example, when the face is recognized, the face recognizer 840 may store the first image in the registered image database 852 to correspond to the recognized user.

The candidate pattern database 851 may include the plurality of candidate patterns. The candidate pattern database 851 may classify the candidate patterns based on ROIs and store the classified candidate patterns. In addition, the candidate pattern database 851 may classify the candidate patterns based on categories corresponding to an ROI. The candidate pattern database 851 may classify the candidate patterns based on users and store the classified candidate patterns for each user.

The registered image database 852 may include at least one second image including a face region of a pre-registered user.

Alternatively, the facial recognition apparatus 800 may not include the candidate pattern database 851 and the registered image database 852, but include the single database 850 to store the candidate patterns and the second image. In such a case, the operations of the candidate pattern database 851 and the registered image database 852 described in the foregoing may be performed by the database 850.

The display 860 may display at least one of the first image, a result of identifying a makeup pattern, a result of applying the makeup pattern, and a result of recognizing a face. When the user determines that the face is not appropriately captured based on the displayed first image, the result of identifying the makeup pattern, or the result of applying the makeup pattern, or a failure in recognizing the face is displayed, the user may recapture an image, and the facial recognition apparatus 800 may re-perform facial recognition on a first image obtained by re-capturing the image.

According to illustrative examples described herein, facial recognition robust against a change in a face by a makeup may be performed by applying an identical makeup pattern to an input image and a registered image.

According to illustrative examples described herein, a success rate of facial recognition may increase by applying a makeup pattern to an ROI using a plurality of candidate patterns classified based on users and stored in a database.

According to illustrative examples described herein, facial recognition robust against a combination of various makeup patterns performed by a user may be performed by determining whether to apply a makeup pattern based on an ROI.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A facial recognition method, comprising:
   identifying a first makeup pattern present in a region of interest (ROI) of a first image obtained from an image sensor, the first image including a face of a user to be recognized;
   determining whether a second makeup pattern is present in an ROI of a second image, the ROI of the second image corresponding to the ROI of the first image, the second image including a face of a pre-registered user, in response to the second makeup pattern not being present in the ROI of the second image, generating a third image by applying the first makeup pattern to the ROI of the second image; and authorizing the user in the first image as the pre-registered user by recognizing the face of the user included in the first image as the face of the pre-registered user when the third image matches the first image.

2. The method of claim 1, wherein the identifying identifies the ROI of the first image and identifies the first makeup pattern from a plurality of makeup patterns corresponding to the ROI of the first image.

3. The method of claim 1, wherein the identifying identifies the first makeup pattern based on at least one of a color tone, a smoothness, a texture, and a highlight of the ROI of the first image.

4. The method of claim 1, wherein the ROI of the first image corresponds to at least one of an eye, a nose, a lip, an eyebrow, hair, a cheek, and a chin of the face of the user included in the first image.

5. The method of claim 1, wherein the applying applies the first makeup pattern to the ROI of the second image if the second makeup pattern is not applied to the ROI of the second image.

6. The method of claim 1, wherein the applying applies the first makeup pattern to the ROI of the second image or generates a fourth image by applying the second makeup pattern to the ROI of the first image if the second makeup pattern is applied to the ROI of the second image, and
the recognizing recognizes the face of the user included in the first image based on the third image or the second image and the fourth image.

7. The method of claim 1, wherein the recognizing includes,
matching a first feature from the ROI of the first image to a second feature from an ROI of the third image.

8. The method of claim 1, wherein a candidate pattern has a similarity to the first makeup pattern and the applying applies the candidate pattern to the ROI of the second image.

9. The method of claim 8, wherein the candidate pattern is classified based on users stored in a database.

10. The method of claim 1, wherein the first image comprises the ROI to which the first makeup pattern is applied, and
the second image comprises an ROI to which the first makeup pattern is not applied.

11. The method of claim 1, wherein the first image and the second image are images comprising ROIs to which different makeup patterns are applied.

12. A non-transitory computer-readable medium comprising program code that, when executed by a processor, performs functions according to the method of claim 1.

13. A facial recognition apparatus, comprising:
a memory storing computer-readable instructions; and
at least one processor configured to execute the computer-readable instructions to cause the apparatus to,
identify a first makeup pattern present in a region of interest (ROI) of a first image obtained from an image sensor, the first image including a face of a user to be recognized,
determine whether a second makeup pattern is present in an ROI of a second image, the ROI of the second image corresponding to the ROI of the first image, the second image including a face of a pre-registered user,
in response to the second makeup pattern not being present in the ROI of the second image, generate a third image by applying the first makeup pattern to the ROI of the second image, and
authorize the user in the first image as the pre-registered user by recognizing the face of the user included in the first image as the face of the pre-registered user when the third image matches the first image.

14. The apparatus of claim 13, wherein the at least one processor is configured to execute the computer-readable instructions to identify the ROI of the first image and identify the first makeup pattern from a plurality of makeup patterns corresponding to the identified ROI.

15. The apparatus of claim 13, wherein the at least one processor is configured to execute the computer-readable instructions to cause the apparatus to identify the first makeup pattern based on at least one of a color tone, a smoothness, a texture, and a highlight of the ROI of the first image.

16. The apparatus of claim 13, wherein the ROI of the first image corresponds to at least one of an eye, a nose, a lip, an eyebrow, hair, a cheek, and a chin of the face of the user included in the first image.

17. The apparatus of claim 13, wherein, the at least one processor is configured to execute the computer-readable instructions to generate the third image by applying the first makeup pattern to the ROI of the second image if the second makeup pattern is not applied to the ROI of the second image.

18. The apparatus of claim 13, wherein, the at least one processor is configured to execute the computer-readable instructions to cause the apparatus generate the third image by applying the first makeup pattern to the ROI of the second image, or generate a fourth image by applying the second makeup pattern to the ROI of the first image if the second makeup pattern is applied to the ROI of the second image, and
the at least one processor is configured to execute the computer-readable instructions to cause the apparatus to recognize the face of the user included in the first image based on the third image or the second image and the fourth image.

* * * * *